(12) United States Patent
Xu

(10) Patent No.: US 11,614,555 B2
(45) Date of Patent: Mar. 28, 2023

(54) METHOD AND SYSTEM FOR CONNECTING ELEMENTS TO SOURCES AND RECEIVERS DURING SPECTRUM ELEMENT METHOD AND FINITE ELEMENT METHOD SEISMIC WAVE MODELING

(71) Applicants: China Petroleum & Chemical Corporation, Beijing (CN); Sinopec Tech Houston, Houston, TX (US)

(72) Inventor: Shiyong Xu, Houston, TX (US)

(73) Assignee: CHINA PETROLEUM & CHEMICAL CORPORATION, Beijing (CN)

(*) Notice: Subject to any disclaimer, the term of this patent is extended or adjusted under 35 U.S.C. 154(b) by 355 days.

(21) Appl. No.: 17/020,076

(22) Filed: Sep. 14, 2020

(65) Prior Publication Data
US 2022/0082718 A1 Mar. 17, 2022

(51) Int. Cl.
G01V 1/28 (2006.01)
(52) U.S. Cl.
CPC .......... *G01V 1/282* (2013.01); *G01V 2210/16* (2013.01); *G01V 2210/614* (2013.01); *G01V 2210/673* (2013.01); *G01V 2210/677* (2013.01)
(58) Field of Classification Search
CPC .............................. G01V 1/282; G01V 1/303
See application file for complete search history.

(56) References Cited

U.S. PATENT DOCUMENTS

| | | |
|---|---|---|
| 4,159,463 A | 6/1979 | Silverman |
| 6,545,944 B2 | 4/2003 | de Kok |
| 6,882,938 B2 | 4/2005 | Vaage |
| 8,295,124 B2 | 10/2012 | Abma |
| 8,724,428 B1 | 5/2014 | Sallas |
| 9,739,901 B2 | 8/2017 | Marc |
| 9,759,827 B2 | 12/2017 | Sallas |
| 9,772,413 B2 | 12/2017 | Krohn |
| 10,386,511 B2 | 8/2019 | Routh |

(Continued)

OTHER PUBLICATIONS

Dimitri Komatitsch and Jeroen Tromp; The Spectral Element Method: An Efficient Tool to Simulate the Seismic Response of 2D and 3D Geological Structures; Apr. 1998; Bulletin of the Seismological Society of America, vol. 88, No. 2, pp. 368-392.

(Continued)

*Primary Examiner* — Bryan Bui
(74) *Attorney, Agent, or Firm* — Novick, Kim & Lee, PLLC; Allen Xue

(57) ABSTRACT

A method, and a system for implementing the method, are disclosed wherein coordinates of survey region are used to locate small pieces of a seismic wave model, usually defined by their nodes (or vertices) and contain information about physical properties, such as liquid or solid, density, velocity that seismic waves propagates in it; and connects them to the appropriate source and receiver sensor. In particular, the method and system disclosed, generates a multi-layer mapping of the survey region by decomposing the survey region into cubes containing small pieces of seismic wave models (the elements), as well as source and receiver location. Those cubes are then indexed depending upon their location and the elements, sources and receivers are assigned to a particular cube thereby creating a multi-layer relationship between the survey region map, the cube map, the elements map, as well as the source and receiver locations.

11 Claims, 8 Drawing Sheets

(56) References Cited

U.S. PATENT DOCUMENTS

| | | |
|---|---|---|
| 10,416,327 B2 | 12/2019 | Akcelik |
| 10,768,327 B2 | 12/2020 | Kaacke |
| 11,474,267 B2* | 10/2022 | Xiao ............... G01V 99/005 |
| 2005/0027454 A1* | 2/2005 | Vaage ............... G01V 1/364 |
| | | 702/17 |
| 2008/0205193 A1 | 8/2008 | Krohn |
| 2009/0168600 A1 | 7/2009 | Moore |
| 2021/0389485 A1* | 12/2021 | Xiao ............... G01V 1/282 |

OTHER PUBLICATIONS

Dimitri Komatitsch, Jean-Pierre Vilotte, Rossana Vai, Jose M. Castillo-Covarrubias, and Francisco J. Sanchez-Sesma; The Spectral Element Method for elastic wave equations application to 2-D and 3-D seismic problems; 1999; Int. J. Numer. Meth. Engng., vol. 45, pp. 1139-1164.

Dimitri Komatitsch and Jeroen Tromp; Introduction to the spectral element method for three-dimensional seismic wave propagation; Jul. 14, 1999; Geophys. J. Int.; vol. 139; pp. 806-822; Department of Earth and Planetary Sciences, Harvard University, Cambridge, MA 02138, USA.

Dimitri Komatitsch and Jeroen Tromp; Spectral-element simulations of global seismic wave propagation—I. Validation; Nov. 12, 2001; Geophys. J. Int.; vol. 149; pp. 390-412; Seismological Laboratory, California Institute of Technology, Pasadena, California 91125, USA.

Diplomarbeit von Bernhard Schuberth; The Spectral Element Method for Seismic Wave Propagation Theory, Implementation and Comparison to Finite Difference Methods; Nov. 7, 2003; Department fur Geo- und Umweltwissenschaften Sektion Geophysik Ludwig-Maximilians-Universitat Munchen.

Dimitri Komatitsch, Seiji Tsuboi, and Jeroen Tromp; The Spectral-Element Method in Seismology; Jan. Jan. 1, 2005; Geophysical Monograph Series 157; DOI: 10 1029/157GM13; pp. 205-227.

Jeroen Tromp, Dimitri Komatitsch, and Qinya Liu; Spectral-Element and Adjoint Methods in Seismology; Jan. 2008; Communications in Computational Physics; vol. 3, No. 1, pp. 1-32.

* cited by examiner

METHOD AND SYSTEM FOR CONNECTING ELEMENTS TO SOURCES AND RECEIVERS DURING SPECTRUM ELEMENT METHOD AND FINITE ELEMENT METHOD SEISMIC WAVE MODELING

TECHNICAL FIELD

The present disclosure generally relates to spectral element method and finite element method, used to simulate elastic-wave propagation in realistic geological structures involving complicated free-surface topography and material interfaces for two- and three-dimensional geometries.

BACKGROUND OF INVENTION

1. Introduction to Seismic Exploration

Exploration seismology aims at revealing the accurate location and amplitude of a target hydro-carbonate within a subsurface, from seismic data acquired at the earth surface. It uses artificially generated elastic waves to locate mineral deposits (including hydrocarbons, ores, water, geothermal reservoirs, etc.), archaeological sites, and to obtain geological information for post-processing applying physics and geology concepts, to obtain information about the structure and distribution of rock types. Usually, seismic exploration projects are done with a business goal in mind and, hence, cost-benefit is an ever-present concern. Nevertheless, seismic methods used during exploration alone cannot be used to determine many of the features that make a project profitable and, even when supplemented by other data, a unique method for processing the information is evident. Seismic exploration usually stops long before unambiguous answers are obtained and before all has been learned that might possibly be learned, because in the judgment of a person's having ordinary skills in the art, further information is better obtained in some other way, such as by drilling a well. As such, seismic methods are in continual economic competition with other methods. Nevertheless, almost all oil companies rely on seismic interpretation for selecting the sites for exploratory oil wells. Despite the indirectness of any the exploration methods used, the likelihood of a successful exploration project is significantly improved if certain known techniques are used in combination with project specific techniques, especially given the enormous amount information produced by 3-D techniques and computing processing power. This is due to the fact, that most receiving systems like geophones or hydrophones display two-dimensional or three-dimensional seismic "time sections", each consisting of large numbers of seismic traces. Although visual inspection of these seismic time sections can intuitively suggest shapes and locations of subsurface reflecting formations, the land acquisition input data may be inaccurate or misleading even to a person having ordinary skills in the art therefore leading to erroneous conclusions as to the actual shapes and locations of subsurface matters. Accordingly, recorded seismic data is usually manipulated for the purposes of producing migrated sections that depict the proper spatial locations of subsurface matter or elements.

2. Recording Seismic and Land Acquisition Input Data

Geophysicists and exploration teams use controlled charges of dynamite or vibrioses trucks for onshore exploration, while airguns are used offshore explorations in order to release waves of sound into the earth. The waves of sound generated by either of these methods, vibrate underground and bounce back to the surface which instead are received on a receiving device placed in a specific pattern across the terrain. Their number and placement patterns are dependent upon the design, cost, and size of the survey.

As waves of sound vibrate into the receiving system, they are recorded or saved to a memory resource, which are then displayed as sound patterns or "traces" of subsurface formations. The patterns of these wave generators and their recording devices create many complexities of scientific data which tend to be displayed as:

Two-dimensional data using a single shot-line of data and representing the intersection of two axes, one horizontal and one vertical;

Three-dimensional surveys which add a horizontal axis, creating the perception of depth and providing additional data points for a potentially more accurate geophysical survey.

Four-dimensional technology, which is made out of 3D readings of the same location over time but showing movements of subsurface hydrocarbons over time.

Four-component technology which measures sound waves both horizontally and vertically.

Regardless of how the acquired data is displayed, it will still be considered "raw" or "unprocessed" and, before it can be used it must go through a series of computerized processes. These processes—filtering, stacking, migrating and other computer analysis, make the data useable but require powerful computers to process complex algorithms through sophisticated computer programs. As computers have become more powerful and processing techniques more sophisticated, it has become common to re-process seismic data acquired in earlier years, creating new opportunities for exploration that could not originally be derived from it.

In most situations, the cross-spread land acquisition geometry has dense shots in the shot line direction and dense receiver in the receiver line direction, especially when the source lines and receiver lines are orthogonal. As such, common shot or common offset processing (including migration) are not optimal for these survey data points and requires several more shots or offsets than the number of common spreads (also known in the art as super shots or super offsets). For fixed migration parameters, the efficiency of a beam migration for a fixed survey is inversely proportional to the number of beam centers or is proportional to the number of traces inside each beam centers.

3. Data Simulation

The calculation of accurate synthetic seismograms for fully 3-D global earth models poses a formidable challenge. The effects of an anisotropic asthenosphere, a slow crust with highly variable thickness, sharp fluid-solid discontinuities at the inner core (ICB) and core-mantle (CMB) boundaries, ellipticity, free-surface topography and attenuation must all be accounted for. Spectral-Element Method (SEM), introduced more than 20 years ago in computational fluid mechanics, and Finite-Element Method (FEM) were developed meet this challenge. Said methods have been used to accurately model wave propagation on local and regional scales, both in 2-D and 3-D. Previous publications have documented that the more specific aspects of global wave propagation can be dealt by using SEM and/or FEM and that the effects of free surface topography can be accommodated therefore showing that fluid-solid boundaries can be accurately modelled while incorporating the effects due to anisotropy or attenuating them.

In contrast, for spherically symmetric earth models, normal-mode summation is the preferred method for the calculation of synthetic seismograms. Normal-mode synthetics are accurate typically for periods greater than about 8 s (i.e. just above the micro-seismic noise band) and involve the summation of a few hundred thousand modes. The effects of fluid-solid boundaries, transverse isotropy with a radial symmetry axis and radial models of attenuation can all be accommodated as well. As such, the use of elastic-wave equations to model the seismic response of heterogeneous geophysical media with topography and internal interfaces is a subject that has been intensively investigated by seismologists. However, the challenge still remains, and involves developing high-performance methods that are capable of solving the elastic-wave equations accurately and that allow one to deal with large and complicated computational domains as encountered in realistic 3D applications. Therefore, current methods stem from a weak variational formulation, which allow a flexible treatment of boundaries, or interfaces, and deal with free-surface boundary conditions naturally. As such, they combine the geometrical flexibility of a low-order method with the exponential convergence rate associated with spectral techniques and therefore suffer from minimal numerical dispersion and diffusion.

Typically, simulation methods have tried to solve two types of problems, but always faced certain limitation. One problem has to do with is elastic waveform modeling used to understand and extract quantitative information from complex seismic data. Realistic geological media that present complicated wave phenomena require methods providing solutions of high accuracy that correctly simulate boundary conditions, surface topography, and irregular interfaces with nonhomogeneous properties. The other problem is related to the assessment of side effects in earthquake ground motion. In particular, 3D surface topography, local velocity variations, and layering can produce complicated amplification patterns and energy scattering. Such effects can modify the ground shaking to a large extent and are relevant for the seismic design of structures.

One of the most common methods used during simulation, involves Finite-difference, but with a varying degree of sophistication. This mainly because conventional schemes suffer from "grid dispersion," near large gradient of the wave field, or too-coarse computational grids. In contrast, for realistic applications (See Frankel, A. (1993), *Three-dimensional simulations of ground motions in the San Bernardino valley, California, for hypothetical earthquakes on the San Andreas fault*, Bull. Seism. Soc. Am. 83, pp. 1020-1041; Olsen, K. B. and R. J. Archuleta (1996), *3-D simulation of earthquakes on the Los Angeles fault system*, Bull Seism. Soc. Am. 86, pp. 575-596; Pitarka, A. and K. Irikura (1996), *Basin structure effects on long period strong motions in the San Fernando valley and the Los Angeles basin from the 1994 Northridge earthquake and aftershocks*, Bull. Seism. Soc. Am. 86, pp. S126-S137), balancing the trade-off between numerical dispersion and computational cost turns out to be rather difficult. For classical second-order centered finite-difference methods, at least 15 points must be used for the wavelength corresponding to the upper half-power frequency (See Kelly, K. R., R. W. Ward, S. Treitel, and R. M. Alford (1976), *Synthetic seismograms: a finite difference approach*, Geophysics vol. 41, pp. 2-27). Grid dispersion and anisotropy can be reduced when using the staggered-grid formulation (See e.g. Madariaga, R. (1976), *Dynamics of an expanding circular fault*, Bull Seism. Soc. Am. 65, pp. 163-182), which is based on the symmetric first-order hyperbolic form of linear elasto-dynamics (See Hughes, T. J. R. and J. E. Marsden (1978), *Classical elastodynamics as a linear symmetric hyperbolic system*, J. Elasticity 8, 97-110). This can also be achieved by using fourth-order centered schemes both in space and time, based on modified wave-equation techniques (See e.g. Dablain, M. A. (1986), *The application of high-order differencing to the scalar wave equation*, Geophysics vol. 51, pp. 54-456). Another difficulty with finite differences is their inability to implement free-surface conditions with the same accuracy as in the interior regions of the model and their lack of geometrical flexibility. Even though some techniques have incorporated surface topographies using methods based on grid deformation or vacuum-to-solid taper (See e.g. Ohminato, T. and B. A. Chouet (1997), *A free-surface boundary condition for including 3D topography in the finite difference method*, Bull. Seism. Soc. Am. 87, pp. 494-515) combined with the staggered grid formulation, they often remain limited to simple geometrical transformations and may affect the stability criterion in the case of grid-deformation techniques, or they require up to 15 grid points per shortest wavelength in the case of vacuum-to-solid techniques, which puts some limitations for narrow free-surface structures. All these ripples make finite-difference methods difficult to use for simulating Rayleigh and interface waves in practical situations.

Other researchers have attempted to simulate 3-D global wave propagation based upon a coupled-mode approach, in which the modes of a 3-D earth model are expressed as a sum over the modes of a spherically symmetric earth model (See e.g. Capdeville, Y., Chaljub, E., Vilotte, J. P. & Montagner, J. P., 2002, *Coupling the spectral-element method with a modal solution for elastic wave propagation in global earth models*, Geophys. J. Int., in press), or direct-solution methods, which use more general basis functions (See e.g. Hara, T., Tsuboi, S. & Geller, R., 1991, *Inversion for laterally heterogeneous earth structure using a laterally heterogeneous starting model: preliminary results*, Geophys. J. Int., vol. 104, pp. 523-540). Coupled-mode and direct-solution synthetics are expensive to calculate, particularly for models with strong lateral variations which require a wide coupling bandwidth. Effects due to boundary undulations are linearized, which makes it difficult to accommodate significant variations in crustal thickness. The finite-element method (See e.g. Igel, H. & Weber, M., 1996, *P-SV wave propagation in the whole mantle using high-order finite differences: application to lowermost mantle structure*, Geophys. Res. Lett., vol. 23, pp. 415-418) provides an alternative approach to the calculation of global synthetics. Nevertheless, it is well-known, that finite-difference methods are inaccurate for surface waves because of numerical dispersion (See e.g. Robertsson, J. O. A., 1996, *A numerical free-surface condition for elastic viscoelastic finite-difference modeling in the presence of topography*, Geophysics, vol. 61, pp. 1921-1934). Furthermore, the design of a grid for the earth poses geometrical difficulties because of the decrease in grid spacing with depth. In addition, diffracted phases are hard to model accurately, in particular at the CMB, because of the staggered nature of the grid. Finally, pseudo-spectral methods have been used to address the problem (See e.g. Tessmer, E., Kessler, D., Kosloff, D. & Behle, A., 1992, *Multi-domain Chebyshev-Fourier method for the solution of the equations of motion of dynamic elasticity*, J. Comput. Phys., 100, 355-363; or Igel, H., 1999, *Wave propagation in three-dimensional spherical sections by the Chebyshev spectral method*, Geophys. J. Int., vol. 136, pp. 559-566). As in finite-difference methods, gridding the entire globe has not yet been accomplished because of difficulties related to the spherical geometry, and the accurate implementation of the free surface boundary condition is problematic. In addition, major velocity discontinuities in the model are difficult to take into account because of the global polynomial nature of the solution. In practice, coupled-mode, direct-solution, finite-difference and pseudo-spectral methods often have to assume that earth models are 2-D axisymmetric to reduce the computational burden. The COSY project (Igel, H. & Geller, R., 2000, *Numerical modeling of global seismic wave propagation: algorithms, accuracy, verification*, Phys. Earth planet. Inter., vol. 119, pp. 1-2) brought together several research groups in an attempt to benchmark numerical algorithms for 1-D and 3-D Earth models. The results were summarized in a special issue of Physics of the Earth and Planetary Interiors Volume 119 (2000) which illustrates many of the difficulties associated with the problem.

4. Data Processing

Processing the acquired seismic input and land acquisition data over a survey region, is typically done by geophysicists using special purpose computers typically comprising hybrid GPU/CPU processors. As such, the processing of these techniques is expensive, but they tend to be technically robust as they provide excellent results.

However, a close association of the geophysicist, the data, and the processor is absolutely essential for the results to be useful. It is just that well logs, known depths, results from ancillary methods, custom formulas, algorithms, as well as the expected results all should be furnished to the computer system to process the data through a computer-implemented software program. This reduces the originally recorded data from the acquisition step (pre-stack data) into the data volumes (post-stack data) that are used for interpretation to locate hydrocarbon reservoirs in the subsurface of the earth. There are many steps involved with the processing of data, that can be categorized into different classes:

1) Categorizing acquired data. This step assigns each trace to its common surface and subsurface location as well as shot to receiver distance and azimuth for example;
2) Time adjustments. This step compensates for travel time differences due to variations in surface topography and near surface geologic variations and source to receiver distance variations. These processes are commonly referred to as "statics" and "nmo or normal moveout".
3) Wavelet compression. This step collapses reflection events into a very short duration event instead of the original recorded signature. This is typically referred to as "Deconvolution" which has a variety of different technical implementations.
4) Noise Attenuation and signal to noise ratio improvements. This step removes as much noise as possible while retaining and enhancing as much of the primary signal as possible.
5) Adding (or stacking) traces that have a common subsurface reflection point.
6) Pre and/or post stack imaging. This step relocates all of the recorded samples and builds an image with the events of the image displayed at their proper positions in time (or depth) and space. Imaging, or migration, is one of the most complex and compute intensive steps in the processing sequence.
7) Other steps that can be used to extract more geologic information from the recorded seismic data to add more information to the interpretation step.

a. Designing of a Cubed Coordinates Map or Mesh

The first step in the data simulation consists of designing a high-quality cubed coordinates map made of a 3-D elements model map having certain coordinates, yet subject to constraints imposed by the required number of grid points per shortest wavelength, the numerical stability condition, and/or acceptable geometrical distortions of the elements. As such, once a high-quality cubed coordinates map or mesh is designed it should encompass seismic wave propagation which are generally a small deformation problem and therefore but does not need consider dynamically deforming meshes or dynamic remeshing. This step is very similar to mesh design for general finite-element methods (See Zienkiewicz [1977] and Hughes [1987] for a thorough introduction to such techniques).

In model simulation, an earth volume is generally subdivided into a number of nonoverlapping elements. In the context of FEM, various types of elements can be used, such as tetrahedra, hexahedra, pyramids, and prisms. In the classical SEM, however, one can only use hexahedra. It is worth mentioning that SEM can be developed on triangles, that can be adapted to geometrically non-conforming meshes based on the so-called 'mortar' matching method (See e.g., Chaljub, E., *Mode'lisation nume'rique de la propagation d'ondes sismiques en ge'ome trie sphe'rique: application a' la sismologie globale* (*Numerical modeling of the propagation of seismic waves in spherical geometry: application to global seismology*), Ph.D. thesis, Universite' Paris VII Denis Diderot, Paris, France, 2000, in French; or Chaljub, E., Y. Capdeville, and J. P. Vilotte, *Solving elastodynamics in a fluid-solid heterogeneous sphere: a parallel spectral element approximation on non-conforming grids*, J. Comput. Phys., vol. 187, pp. 457-491, 2003), and that such non-conforming meshes can be coupled with other numerical or quasi-analytical techniques, such as normal-mode summation (Capdeville, Y., E. Chaljub, J. P. Vilotte, and J. P. Montagner, *Coupling the spectral element method with a modal solution for elastic wave propagation in global Earth models*, Geophys. J. Int., vol. 152, pp. 34-67, 2003). Yet, these lead to many theoretical complications. Nevertheless, the basic idea is that on hexahedral elements one can use a tensor product of 1-D basis functions, which in turn gives an exactly diagonal mass matrix, while with tetrahedra the tensorization is lost. As in any FEM, the mesh needs to be geometrically conforming, i.e., the six sides of each hexahedral element must match up exactly with the sides of neighboring elements.

The shape of the physical grid is then formulated by a mapping (deformation) of a reference cube. Cartesian points $x=(x, y, z)$ within a given deformed, hexahedral element are then mapped to the reference cube based upon the transform formula of:

$$x(\xi) = \sum_{a=1}^{n_a} N_a(\xi) x_a \qquad (1)$$

Where points such a source or receivers, within the referenced cube are denoted by the vector $(\xi)=(\xi, \eta, \zeta)$, where $-1 \leq \xi \leq 1$, $-1 \leq \eta \leq 1$ and $-1 \leq \zeta \leq 1$. In most implementations, the geometry of the spectral elements is controlled by $n_a=27$ points, or anchors, $x_a$. The na shape functions $N_a$ are triple products of 1-D degree-2 Lagrange polynomials in the three orthogonal directions of space in the reference cube. The three Lagrange polynomials of degree 2 with three control points $\xi_0=-1$, $\xi_1=0$, and $\xi_2=1$ are $l_0^2(\xi)=\frac{1}{2}(\xi)(\xi-1)$, $l_1^2(\xi)=1-(\xi)^2$, $l_0^2(\xi)=\frac{1}{2}(\xi)(\xi-1)$, and $l_2^2(\xi)=\frac{1}{2}(\xi)(\xi+1)$. A Jacobian variable J is then used to define the relationship between a small volume dx, dy, dz within a given finite element and a volume dξ, dη, dζ in the reference cube dx dy dz=J dξ dη dζ. The partial derivative matrix $$\frac{dx}{d\xi}$$

needed for the calculation of the Jacobian is obtained by analytically differentiating the mapping. The partial derivatives of the shape functions $N_a$ are expressed in terms of Lagrange polynomials of degree 2 and their derivatives at the 27 control points. As in any FEM, the Jacobian matrix plays a critical role in designing a good cubed mesh for a realistic 3-D model. First, the determinant of the Jacobian matrix j should never vanish to ensure that the local mapping is unique and invertible. Second, local variations of the Jacobian should be smooth everywhere within the mesh. Sharp local variations indicate highly distorted elements that lead to inaccurate or even unstable calculations.

To avoid a staircase discretization of major interfaces and the related spurious diffraction that appears in methods based on a regular grid of points, a good mesh should honor all the major discontinuities in the model. In addition, wave speed usually increases with depth (e.g., sediments above bedrock at the local or regional scale, or crust above mantle on a global scale), and ideally one wants to increase the size of the elements with depth in order to maintain a similar number of points per wavelength everywhere in the model (i.e., to provide the same numerical resolution everywhere). As such, for the creation of the aforementioned cubed mesh a person having ordinary skills in the art will first decompose a sphere into six blocks using the concept of the 'quasi-uniform gnomonic projection', or 'cubed sphere'. Then, it will mesh each of the six blocks, making sure that they match perfectly at their common interfaces. Following Chaljub, supra, the singularity of coordinates at the Earth's center is avoided by placing a small cube around the center of the inner core. The mesh within this cube will then match up with the cubed sphere mesh at the inner-core boundary (ICB). As it is common practice in the art, the final mesh needs to honor all first-order discontinuities in Preliminary Reference Earth Model (PREM), which are the middle crust at a depth of 15 km, the Moho at a depth of 24.4 km, the upper mantle discontinuities at depths of 220 km, 400 km, and 670 km, the core-mantle boundary (CMB), and the ICB; it also honors second-order discontinuities at 600 km, 771 km, and at the top of D". The density of the mesh is increased in the upper part of the model (crust and upper mantle) based upon a set of geometrical doubling mesh cells. A first doubling region is introduced below the Moho, a second below the 670 km discontinuity, and a third just above the ICB. Note that for other classical models, such as IASP91, or mantle model S20RTS whose lateral variations are superimposed on PREM, the mesh would be slightly modified because it would need to honor a set of major discontinuities located at slightly different depths.

5. Summary

In summary, when seismic waves are used in exploration, archaeological studies, or engineering projects that requires knowing properties of seismic wave propagation in the earth model simulations are a widely used tool for the study of wave propagation in the earth because of the complexity of the earth. The methods used for seismic wave simulation can be divided into two categories, physical simulation and digital simulation. With the development of computer technology and the advancement of simulation algorithms, numerical simulation has become more widely used because it saves money and time. Numerical simulation is also necessary for seismic imaging, such as Reverse Time Migration (RTM), and seismic inversion, such as Full Waveform Inversion (FWI). As a matter of practice in the art, commonly used seismic wave numerical simulations have involve mainly the use of Finite Difference Method (FDM), Finite Element Method (FEM) and Spectral Element Method (SEM). When compared with FDM, both FEM and SEM have special advantages when dealing with complicated earth models, such as topography, fluid-solid interface, complicate earth structures, strong velocity variations and anisotropy etc. Yet, it has been observed that SEM is more cost-efficient than FEM.

Nevertheless, as observed, the first step when performing FEM and SEM is to discretize the simulation domain into many elements. These elements are in variable sizes and shapes, as well as not sorted in order of coordinates, which means that for a given coordinate (x, y, z), a person having ordinary skills in the art cannot tell which element a certain source or receiver is in, without searching within all elements. As such, when sources and receivers need to be located within the model this leads to an impractical, ineffective and cost-prohibited approach. Therefore, there's a need for new and novel method and system for elastic-wave propagation that can simply assess, solve, and dramatically reduce computational cost and processing time in locating sources and receivers during SEM and FEM seismic wave simulation.

SUMMARY OF THE INVENTION

The present invention discloses a novel method and system to be used in a computer program product, that connects elements to sources and receivers during Spectrum Element Method and Finite Element Method seismic wave modeling. In particular, the present invention discloses a multi-layer mapping approach towards being able to locate or connect the myriad of sources and receivers placed within a survey region to be explored, and imaged. First, the present novel method and system maps the entire survey region in coordinate domain thereby creating a seismic wave model domain with coordinates. Then, it divides the seismic wave model domain into smaller cubes with regular coordinate grids establishing a direct mapping relation from coordinates to cube indices. As a result, for a given source or receiver the present novel method and system can simply and quickly find out which cube a given source or receiver it is in, by calculating its cube index. Thereafter, the present novel method and system proceds to search for each element to figure out which cube it is in, and thus establishes another mapping relationship which goes from cubes to elements. As a result, the present novel method and system will be able to know the cube a certain source or receiver it is in, and thereafter only need to search for the elements in that particular cube to find out which element the source or receiver belongs to. Nevertheless, in order to locate a particular source or receiver at coordinates (x, y, z), the present novel method and system will use a computed cube index value, based on the acquired coordinates, and locate the corresponding cube the source or receiver it is in, to assure that a given source or receiver is inside one of the elements in the cube. Finally, once the sources and receivers have their respective coordinates assigned, as well as tied to a particular cube, the present novel method and system will search for the elements in the cube and connect them the appropriate source and receiver they are in. This way the present novel method and system will have a complete connection of the coordinates from a survey region, to its most miniscule element thereby minimize resources, and computational costs.

Notwithstanding the aforementioned, further details, examples, and aspects of the invention will still be described below in more detail, also referring to the drawings listed in the present invention.

BRIEF DESCRIPTION OF THE DRAWINGS

The teachings of the present invention can be readily understood by considering the following description in conjunction with the accompanying drawings.

DETAILED DESCRIPTION OF THE INVENTION

Reference will now be made in detail, to several embodiments of the present disclosures, examples of which, are illustrated in the accompanying figures. It is noted that wherever practicable similar or like reference symbols may be used in the figures and may indicate similar or like functionality. The figures depict embodiments of the present disclosure, for purposes of illustration only. One skilled in the art will readily recognize from the following description that alternative embodiments of the structures, systems, and methods illustrated therein may be employed without departing from the principles of the disclosure described herein.

Seismic waves are used in exploration, archaeological studies, and engineering projects that require, a person having ordinary skills in the art, to know properties of seismic wave propagation in an earth model. Said studies can be divided into two categories: (a) physical, or (b) numerical. The latter has become widely used in the art, mainly due to the development of computer technology, the advancement of algorithms, and the cost and time savings it provides. Furthermore, numerical modelling is also necessary for seismic imaging, such as Reverse Time Migration (RTM), and seismic inversion, such as Full Waveform Inversion (FWI). Commonly used seismic wave numerical simulation mainly includes Finite Difference Method (FDM), Finite Element Method (FEM) or Spectral Element Method (SEM). Compared with FDM; FEM and SEM have special advantages when dealing with complicated earth models, such as topography, fluid-solid interface, complicate earth structures, strong velocity variations and anisotropy etc. Nevertheless, SEM is more cost-efficient than FEM, and very rarely are they used in combination.

Figure 2:
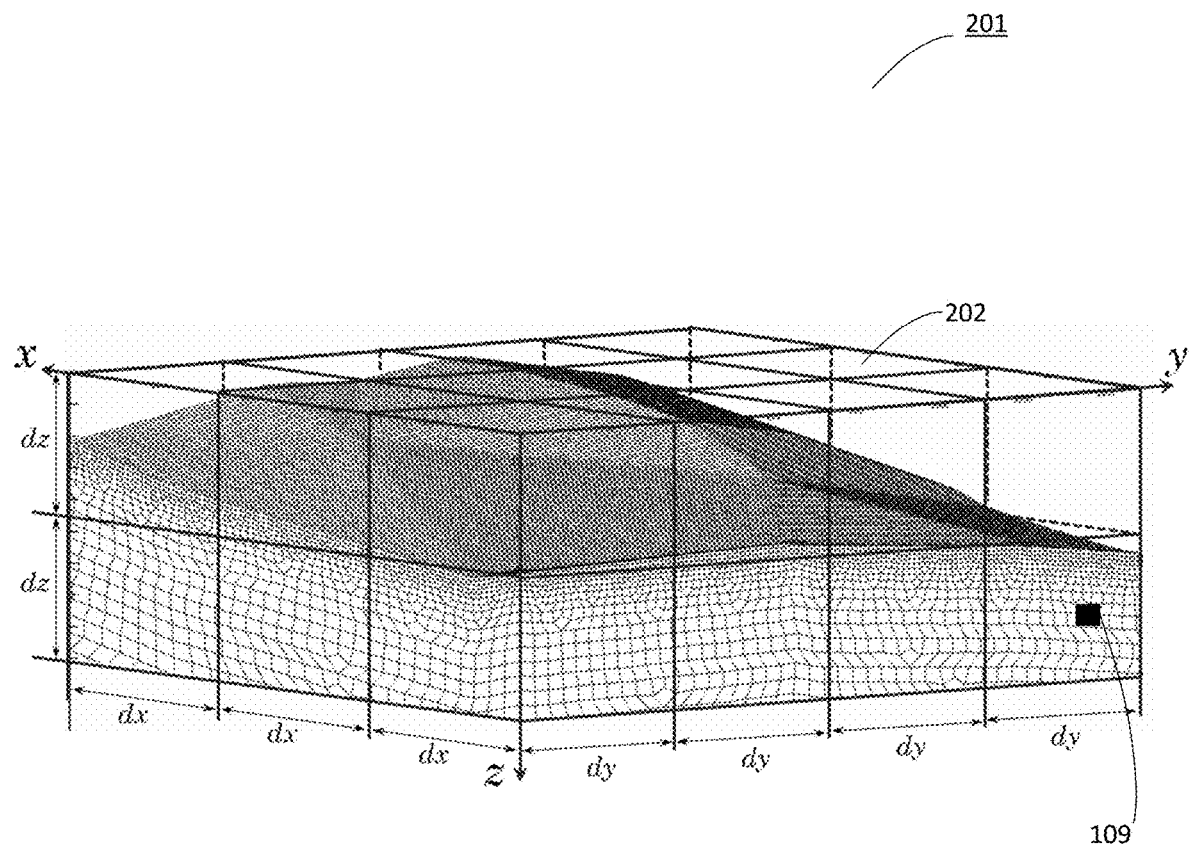
FIG. 2, is an illustration showing the survey region in a 3D model domain as it is divided into cubes by the method and system, according to an embodiment of the present disclosure.

A person having ordinary skills in the art will realize that the first thing that is typically done in FEM and SEM, is to discretize the model domain into many elements. Then, the user will have to manually locate sources and receivers, leaving the user of the method and system to figure out which element each source and receiver it is in. However, since these elements vary in size and shapes, they are usually not sorted in order of coordinates, which means that for a given coordinate (x, y, z) a person having ordinary skills in the art, will not be able tell which source or receiver it is in, without searching for all elements. As such, the embodiments herewith disclosed, provide for an automated, fast and efficient method and system to locate sources and receivers during SEM or FEM seismogram modelling. The sequence of steps of this method can be summarized as following:

First, the method and system acquires the coordinates for each source and receiver within a particular survey region creating a grid model. It then divides the model into smaller cubes with regular coordinate grids and establishes a direct mapping relation from coordinates to cube indices. As such, the embodiments of the present disclosure will divide the model into cubes with regular coordinate grids, as shown in FIG. 2, and establish a map from points (x, y, z) to cubes. For a discretized model in 3D with sizes of $x \in [x_0, x_1]$, $y \in [y_0, y_1]$, and $z \in [z_0, z_1]$, the method and system will automatically select the number of cubes to be split in each dimension as $n_x$, $n_y$ and $n_z$. Cube size in each dimension can be calculated using the following expression:

$$\begin{cases} dx = \dfrac{x_1 - x_0}{nx} \\ dy = \dfrac{y_1 - y_0}{ny} \\ dz = \dfrac{z_1 - z_0}{nz} \end{cases} \qquad (2)$$

As a result, for a given source or receiver, the method and system can now, simply and quickly, find out which to which cube they belong by calculating its cube index. Then, the method and system searches for all elements within each cube and establishes another mapping relation from cubes to elements. The method and system defines each cube as a container, then loops through all elements to figure out which cube each element belongs to. Thereafter, the method and system will calculate the cube index based on the grid coordinates and connect source or receiver to the respective elements within the cube. For each element, it checks each of its vertexes, acquires coordinates (x, y, z) of the vertex and calculates the index of the cube it is in accordance to the following expression:

$$\begin{cases} ix = \lfloor \frac{x-x_0}{dx} \rfloor \\ iy = \lfloor \frac{y-y_0}{dy} \rfloor \\ iz = \lfloor \frac{z-z_0}{dz} \rfloor \end{cases} \quad (3)$$

where ix, iy and iz are cube indices in each dimension, and $\lfloor \ \rfloor$ is the floor function that gives the largest integer less than or equal to its operand.

The method and system, then puts the index of the element into the container corresponding to that cube. As a result, the method and system has now a complete trace of source or receiver coordinates, to cubes, to elements. Therefore, the amount of computing resources is greatly reduced in locating sources and receivers in SEM or FEM during seismic modelling because the proposed method and system only needs to search for the elements in one cube instead of searching for all elements in the whole model. The number of elements in one cube is only a small portion of, and much less than, the total number of elements over a survey region.

Figure 1:
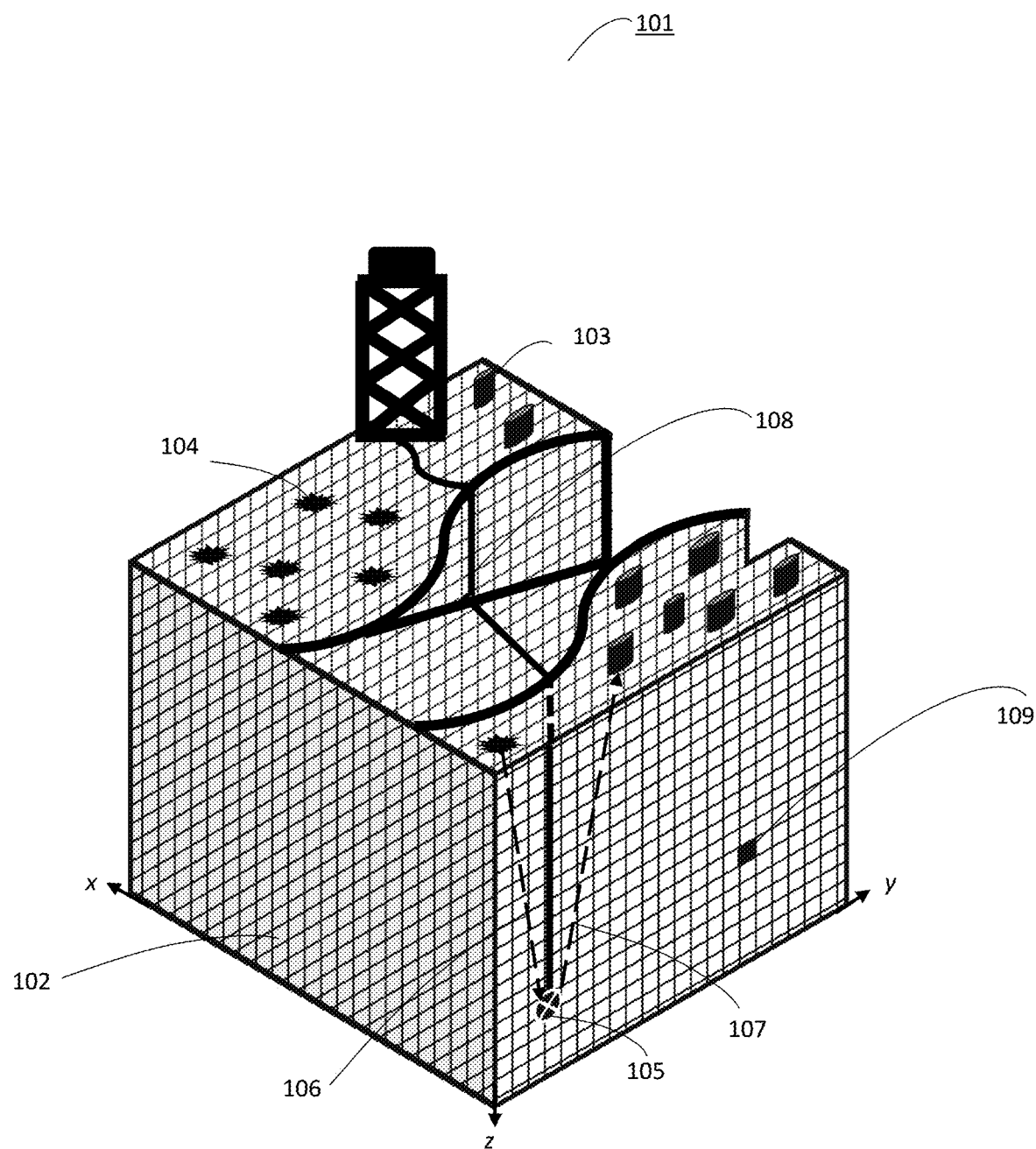
FIG. 1, is a schematic diagram showing a cross-sectional view of a survey region with a well location, source locations, receiver locations, and elements, according to an embodiment of the present disclosure.

Turning over to FIG. 1, it represents a typical survey region 101, over a land-based region represented as 102, in which the preferred embodiment of the present invention is useful. It is important to note, that the survey region 101 is shown in a cross-sectional view with axis x, y, z marked and already divided into elements 109 for later processing, and analysis by computing program product embodied in a computing system device of 601, represented in FIG. 5. Persons of ordinary skill in the art, will recognize that seismic survey regions produce detailed images of local geology in order to determine the location and size of possible hydrocarbon (oil and gas) reservoirs, and therefore a well location 105. Nevertheless, as observed in FIG. 1, when using MWD downhole systems 108 during directional drilling, in order to reach the well or reservoir 105, the MWD downhole system 108 must deviate from a vertical downward trajectory, to a trajectory that is kept within prescribed limits of azimuth and inclination to reach a well or reservoir 105. This degree of deviation is given by a myriad of situations, but most likely due to populated or obstructed areas.

In these survey regions 101, sound waves bounce off underground rock formations during blasts at various points of incidence or shots 104, and the waves that reflect back to the surface are captured by seismic data recording sensors, 103, transmitted by data transmission systems 603, wirelessly, from said sensors, 103, then stored for later processing, and analysis by the method used in a computer program product, that connects elements to sources and receivers during Spectrum Element Method and Finite Element Method seismic wave modeling 501 of FIG. 5, as well as the computing program product embodied in a computing system device 601, represented in FIG. 6. In particular, persons having ordinary skill in the art will soon realize that the present example shows a common midpoint-style gather, where seismic data traces are sorted by surface geometry to approximate a single reflection point in the earth. In this example, data from several shots and receivers may be combined into a single image gather or used individually depending upon the type of analysis to be performed. Although the present example may illustrate a flat reflector and a respective image gather class, other types or classes of image gathers known in the art may be used, and its selection may depend upon the presence of various earth conditions or events. As shown on FIG. 1, the reflections captured by the multiple seismic data recording sensors 103, each of which will be placed at different location offsets from each other, and the well 105. Because all points of incidences or shots 104, and all seismic data recording sensors 103 are placed at different offsets, the survey seismic data or traces, also known in the art as gathers, will be recorded at various angles of incidence represented by reflections to (downward transmission rays) 106 and from (upward transmission reflection) 107 the reservoir 105. Well location 105, in this example, is illustrated with an existing drilled well attached to a wellbore, 108, along which multiple measurements are obtained using techniques known in the art. This wellbore 108, is used to obtain well log data, that includes P-wave velocity, S-wave velocity, Density, among others. Other sensors, not depicted in FIG. 1, are placed within the survey region to also capture horizons data information required for interpreters and persons of ordinary skilled in the art to perform various geophysical analysis. In the present example, the gathers will be sorted from field records in order to examine the dependence of amplitude, signal-to-noise, move-out, frequency content, phase, and other seismic attributes, on incidence angles, offset measurements, azimuth, and other geometric attributes that are important for data processing and imaging and known by persons having ordinary skills in the art.

FIG. 2, is an illustration showing the survey region 101 in a 3D model domain 201 as it is divided into cubes 202 with multiple elements 109 inside of said cubes and with regular coordinate grids which is used to establish a map from points (x, y, z) to cubes. For the discretized model in 3D with sizes of $x \in [x_0, x_1]$, $y \in [y_0, y_1]$, $z \in [z_0, z_1]$, the number of cubes to be split in each dimension is represented as nx, ny and nz. Cube size in each dimension can then be calculated according to expression (2). Then for any given source 104 or receiver 103 at point (x, y, z) within the simulation domain, it can be quickly analyzed and processed by embodiments of the present disclosure, which cube it is in, in accordance to expression (3), where ix, iy and iz are cube indices in each dimension, and $\lfloor \ \rfloor$ is the floor function that gives the largest integer less than or equal to its operand.

Figure 3:
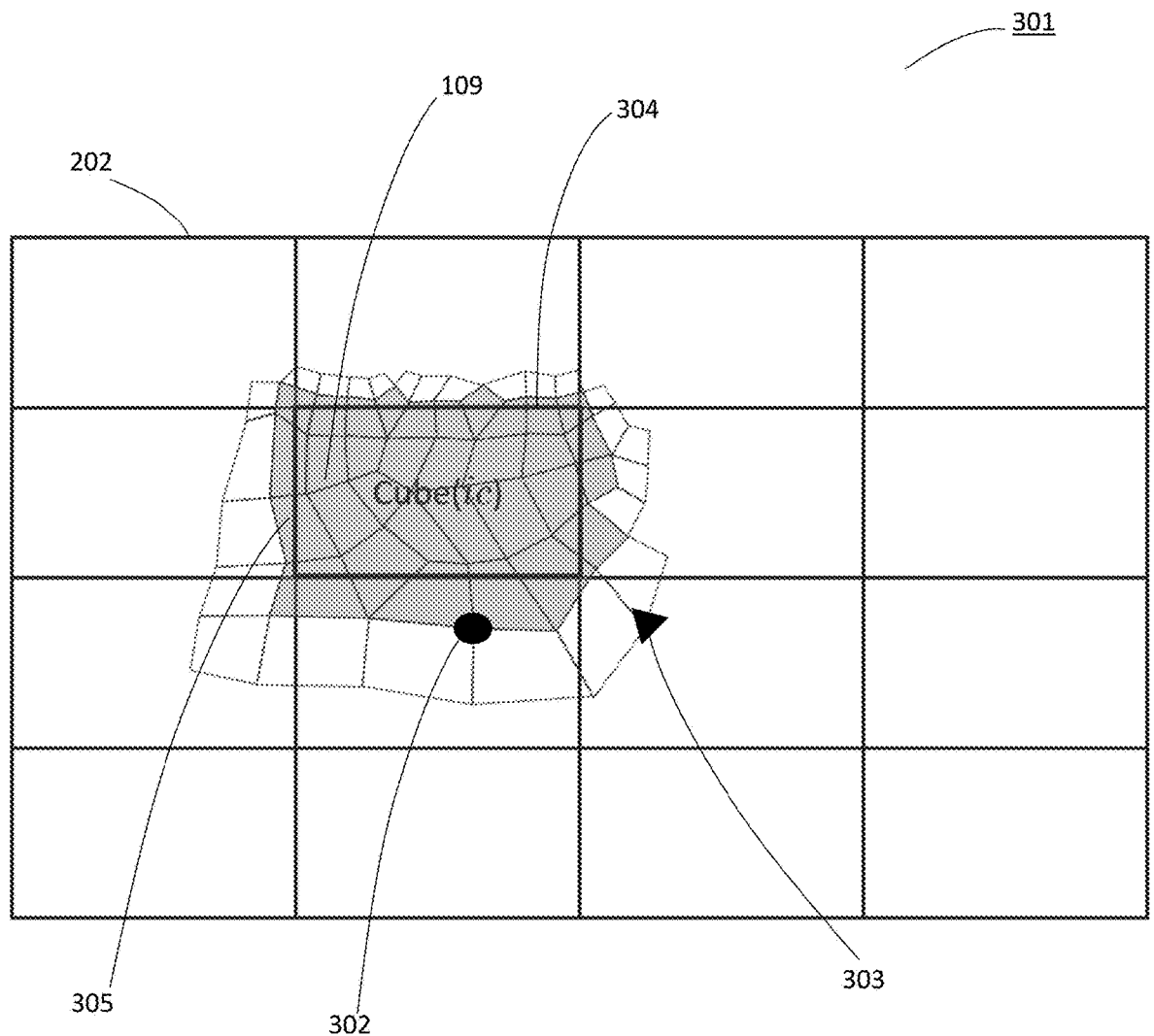
FIG. 3, is an illustration from a top view of the survey region model domain as it is divided into cubes by the method and system, with elements shown belonging to more than one cubes when their nodes and vertexes are located in different cubes, according to an embodiment of the present disclosure.

Then, another map 301 from cubes to elements is established by looping through all elements 109, to figure out which cubes 202, they are in as represented in FIG. 3. In 301, the map defines each cube 202 as a container and for each element, 109 it checks each of its vertices 302, or nodes 303, while getting their respective (x, y, z) coordinate and calculating the index of the cube it is in using expression (3), then puts the index of the element into the container corresponding to that cube as shown by 304. A person having ordinary skills in the art, will soon realize however that, one element may belong to more than one cube if its vertices 302 or nodes 303, are located in different cubes as that shown by 305. To sort this out, embodiments of the present disclosure process algorithm 401 represented by FIG. 4.

Figure 4A:
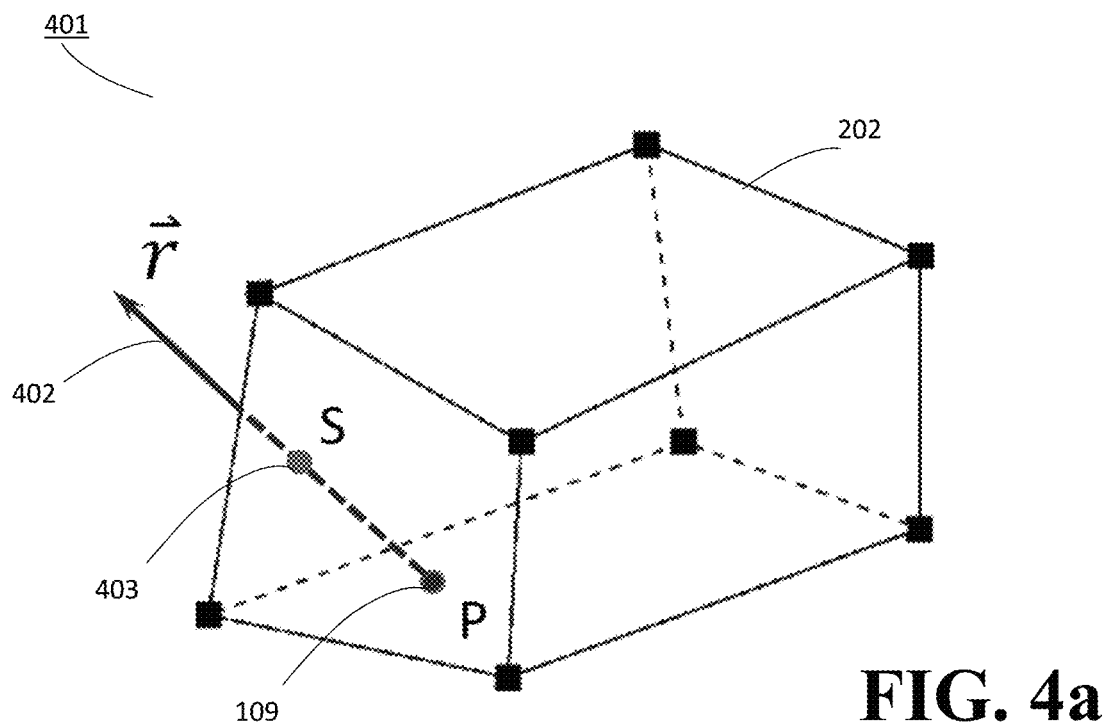
FIG. 4, is an illustration of the algorithm used to cast a ray $\vec{r}$ from a given point P in an element to any direction. When the given point P is inside the cube or polyhedron, the ray $\vec{r}$ will pass its boundary an odd number of times, as shown on FIG. 4a. On the other hand.
FIG. 4b shows the given point P in an element outside the cube or polyhedron, and ray $\vec{r}$ passing its boundaries zero or even number of times, which will indicate the method and system of the present invention, that an element is not inside the cube or polyhedron, according to an embodiment of the present disclosure.
Figure 4B:
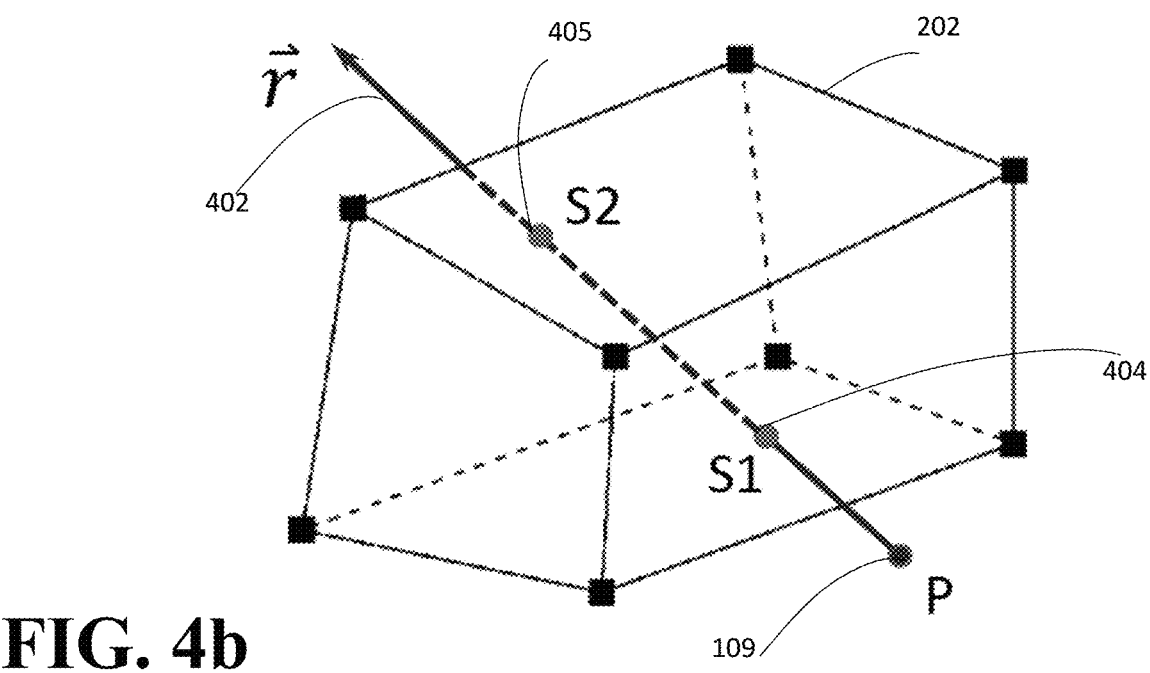

In FIG. 4, embodiments of the present disclosure cast a ray $\vec{r}$ 402 from the given point P in element 109 to any direction. It then computes using the computing program product embodied in a computing system device 501, to compute the number of times the ray 402 passes the boundary 403 of the cube or polyhedron 202. The given point P will be inside the cube or polyhedron 202, if ray $\vec{r}$ 402 passes its boundary 403 an odd number of times, as shown on FIG. 4a. On the other hand, FIG. 4b shows given point P in element 109 outside the cube or polyhedron 202, and ray $\vec{r}$ 402 passing its boundaries 404 or 405, zero or even number of times, which will indicate the method and system of the present invention, that element 109 is not inside the cube or polyhedron 202 and therefore avoid it when locating sources 104 or receivers 103.

Figure 5:
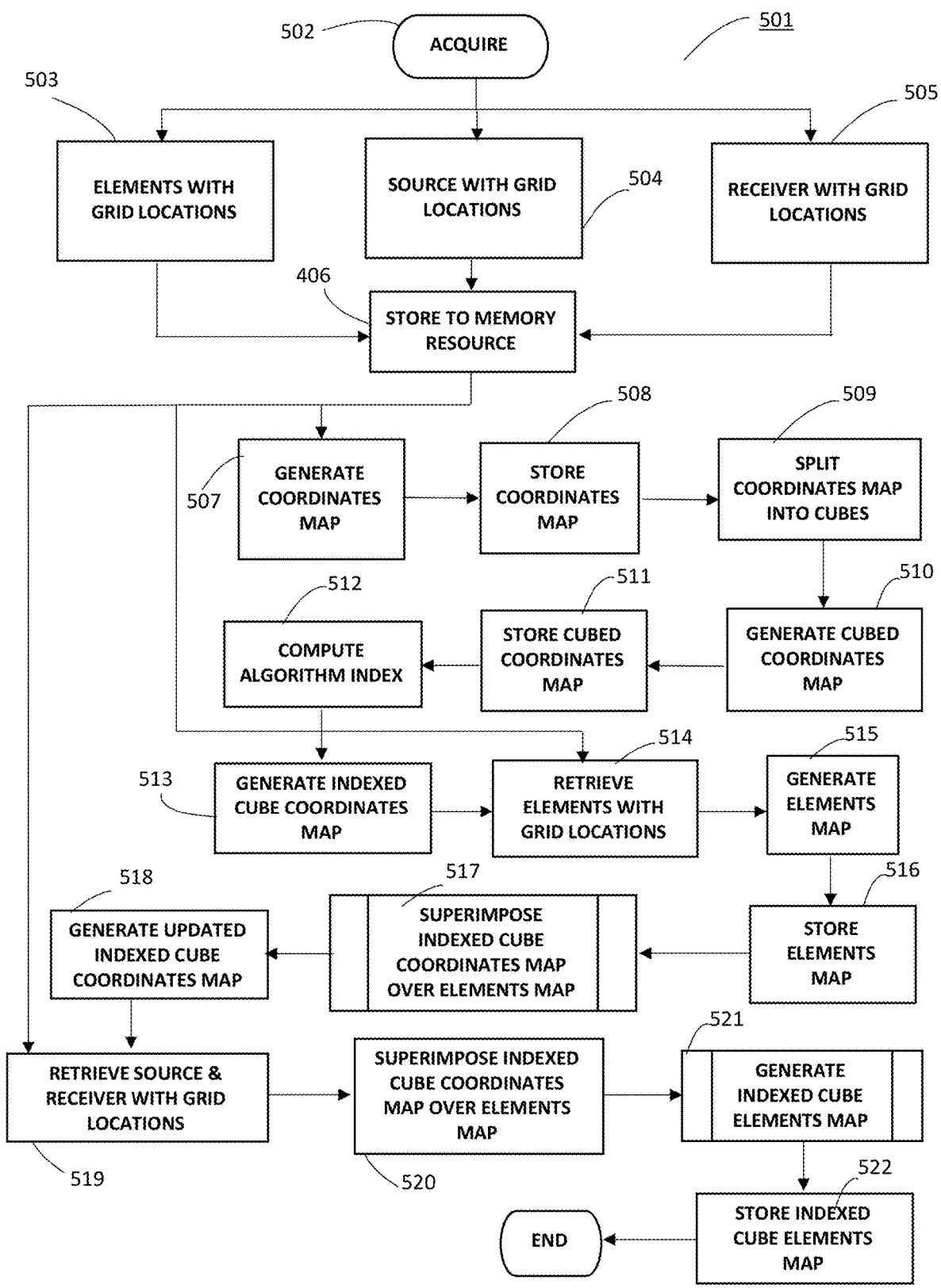
FIG. 5, illustrates a flow chart of the method to be used in a computer program product, that connects elements to sources and receivers during Spectrum Element Method and Finite Element Method seismic wave modeling, according to an embodiment of the present disclosure.

With regards to FIG. 5, it illustrates a flow chart with an overview of the preferred embodiment of the invention. The method to be used in a computer program product, that connects elements to sources and receivers during Spectrum Element Method and Finite Element Method seismic wave modeling 501, begins by acquiring certain information from a survey region 101. In particular, the method starts when the non-transitory computer readable device, 605, of the computing program product embodied in a computing system device 601, receives a message hook from the telemetry system 602 that it has started acquiring data at 502, containing elements with coordinate grid locations 503, source with coordinate grid locations 504, and receiver coordinate grid locations 505. Said data containing grid locations 503, 504, and 505 is acquired by the telemetry system 502, from a plurality of receiver sensors 103 located over a defined survey region 101. Nevertheless, a person having ordinary skills in the art, will soon realize that the acquired data 503, 504, and 505 may also be acquired in a variety of other ways, like from an external database already containing said data, from a variety of seismic surface or subsurface seismic tomography surveys, as well as from the memory resource 603, of the computing program product embodied in a computing system device 601.

Once said data has been acquired, the non-transitory computer readable device, 605 will message the memory resource 603, of the computing program product embodied in a computing system device 601, to begin storing at 506 the acquired data. Once the memory resource 603 has completed storing at 506 it will then message the non-transitory computer readable memory device, 605 to begin, at 507 generating a coordinates map from the stored elements coordinate grid locations. A coordinates map will look like survey region 101, wherein all elements, sources or points of incidence 104, as well as receiving sensors 103, will contain an (x, y, z) coordinate. Upon completely generating the coordinates map at 507, the non-transitory computer readable device, 605 will message the memory resource 603, of the computing program product embodied in a computing system device 601, to begin storing at 508 the coordinates map. Completion of step 508 will bigger a message hook for the non-transitory computer readable memory device, 605 to begin, at 509, splitting the stored coordinates map into cubes having coordinate grid locations. However, the acquired elements 503 may be in variable sizes and shapes, and not sorted in order of coordinates, which means that for a given coordinate (x, y, z), the method and system may not be able to tell which element is inside certain cubes, without searching for all elements. A person having ordinary skills in the art will realize, that most survey regions 101, usually involve thousands of sources and hundreds of thousands, or even millions of receivers for each source, as such most methods and systems spend enough time and computational resources trying to locate sources and receivers in SEM and FEM seismic wave modeling, that ultimately renders the entire project too costly or untimely. Therefore, to solve this problem while drastically reducing computational cost and processing time in locating, elements, sources and receivers within a certain cubes, embodiments of the propose disclosure use the regular coordinate grids of survey region 101, as shown on FIG. 2 and establishes a direct mapping relation from coordinate points to cubes. For a discretized model in 3D with sizes of $x \in [x_0, x_1]$, $y \in [y_0, y_1]$, and $z \in [z_0, z_1]$, the non-transitory computer readable device 605, of the computing program product embodied in a computing system device 601, will automatically select the number of cubes to be split in each dimension as $n_x$, $n_y$, and $n_z$. Cube size in each dimension are then calculated according to expression (2) and at 510, the non-transitory computer readable device 605, of the computing program product embodied in a computing system device 601, will generate a cubed coordinates map similarly to that of FIG. 2. Upon completely generating the cubed coordinates map at 510, the non-transitory computer readable device, 605 will message the memory resource 603, of the computing program product embodied in a computing system device 601, to begin storing at 511 the cubed coordinates map. The non-transitory computer readable device, 605 will receive a message the memory resource 603 that step 511 has been completed and begin computing an algorithm index for the stored cube coordinates map according to expression (3). Once all cubes have been indexed at step 511 the non-transitory computer readable device, 605 will begin generating, as an interim step, an indexed cube coordinates map at step 512. The non-transitory computer readable device, 605 will then start retrieving at step 514 the stored elements coordinate grid locations from the memory resource 603 and then generate at 515, an elements map applying the retrieved elements coordinate grid location as that shown on FIG. 3. The non-transitory computer readable device, 605 will send a message the memory resource 603 that step 515 has been completed, and the generated elements map applying the retrieved elements coordinate grid location will then be stored to the memory resource 603.

Figure 7:
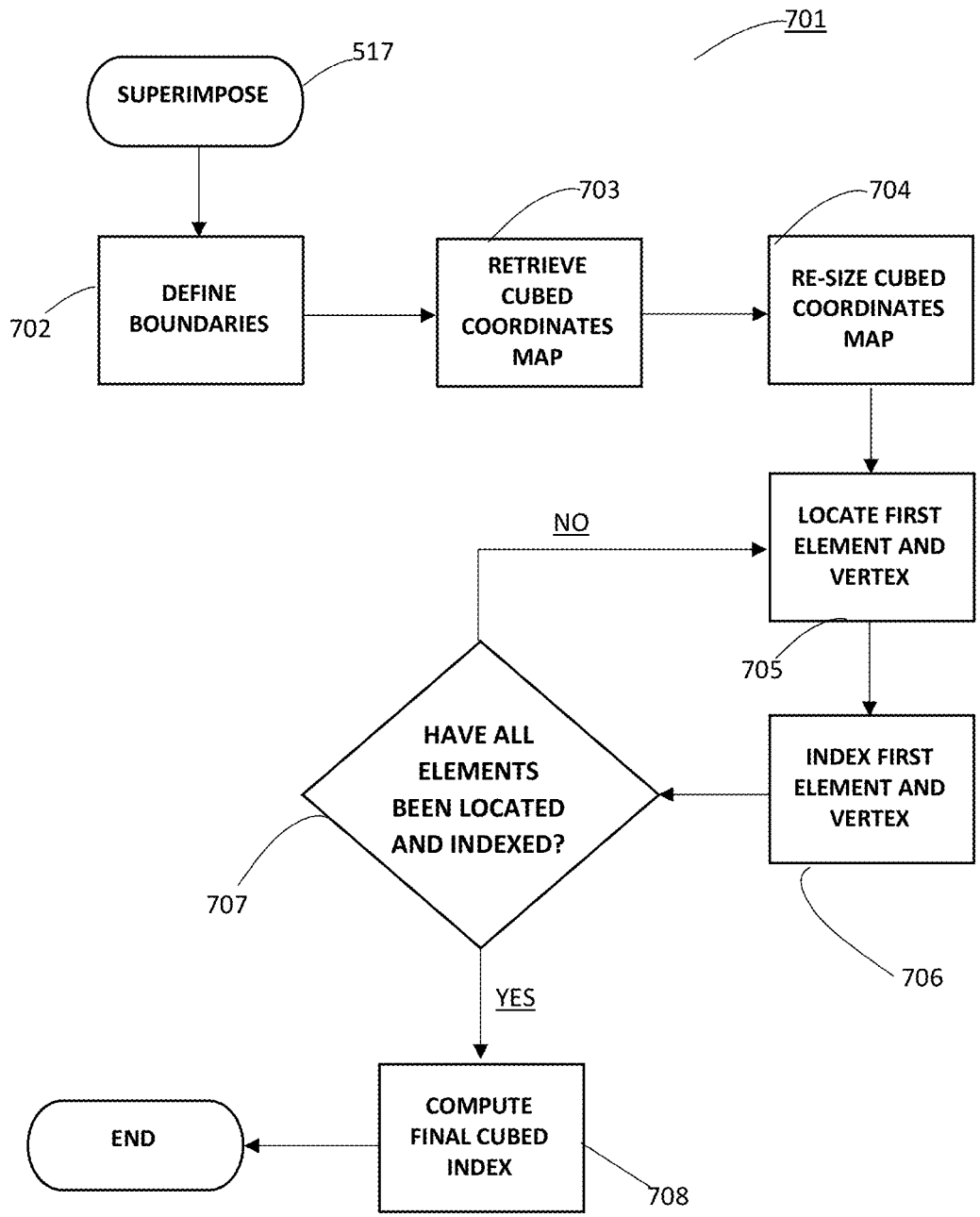
FIG. 7, illustrates a flow chart of the sub-routine of superimposing the generated indexed cube over the stored elements map; according to an embodiment of the present disclosure.

Upon successful storage of the elements map at step 603, the non-transitory computer readable device, 605 will initiate subroutine 517 which involves the computationally intensive action of superimposing the generated indexed cube over the stored elements map. This subroutine is illustrated by flow chart 701 of FIG. 7 and comprises of first, the non-transitory computer readable device, 605 defining boundaries by computing the maximum and minimum coordinates of the retrieved elements coordinate grid locations at step 511, from survey region 101. The non-transitory computer readable device, 605 will then message the memory resource 603, that will begin retrieving at 703, the stored cubed coordinates maps which will then be re-sized at step 704 by computing an algorithm comprising expression (2). Once re-sized, the non-transitory computer readable device, 605 will begin randomly select a first element and vertex at step 705, and index at 706, that randomly located first element and vertex with respect to the re-sized cubed coordinate map of 704. Then, the non-transitory computer readable device, 605 will continue repeating at 707 the steps of locating 705 and indexing 706 other randomly selected elements and vertices of an element within the re-sized stored cubed coordinate map size until all elements inside a cube have been located and indexed. Once the non-transitory computer readable device, 605 has located and indexed all elements inside a cube, it will compute at 708 a final cube index for every located and indexed element and vertex of an element according to expression (3). The completion of this step will signal the non-transitory computer readable device, 605 that subroutine 701 has been completed and to begin at 518 generating an updated indexed cube coordinates maps with the elements map. After which step, the non-transitory computer readable device, 605 will message the memory resource 603 that it will begin retrieving at 519 the acquired source, and receiver coordinate grid locations.

Figure 8:
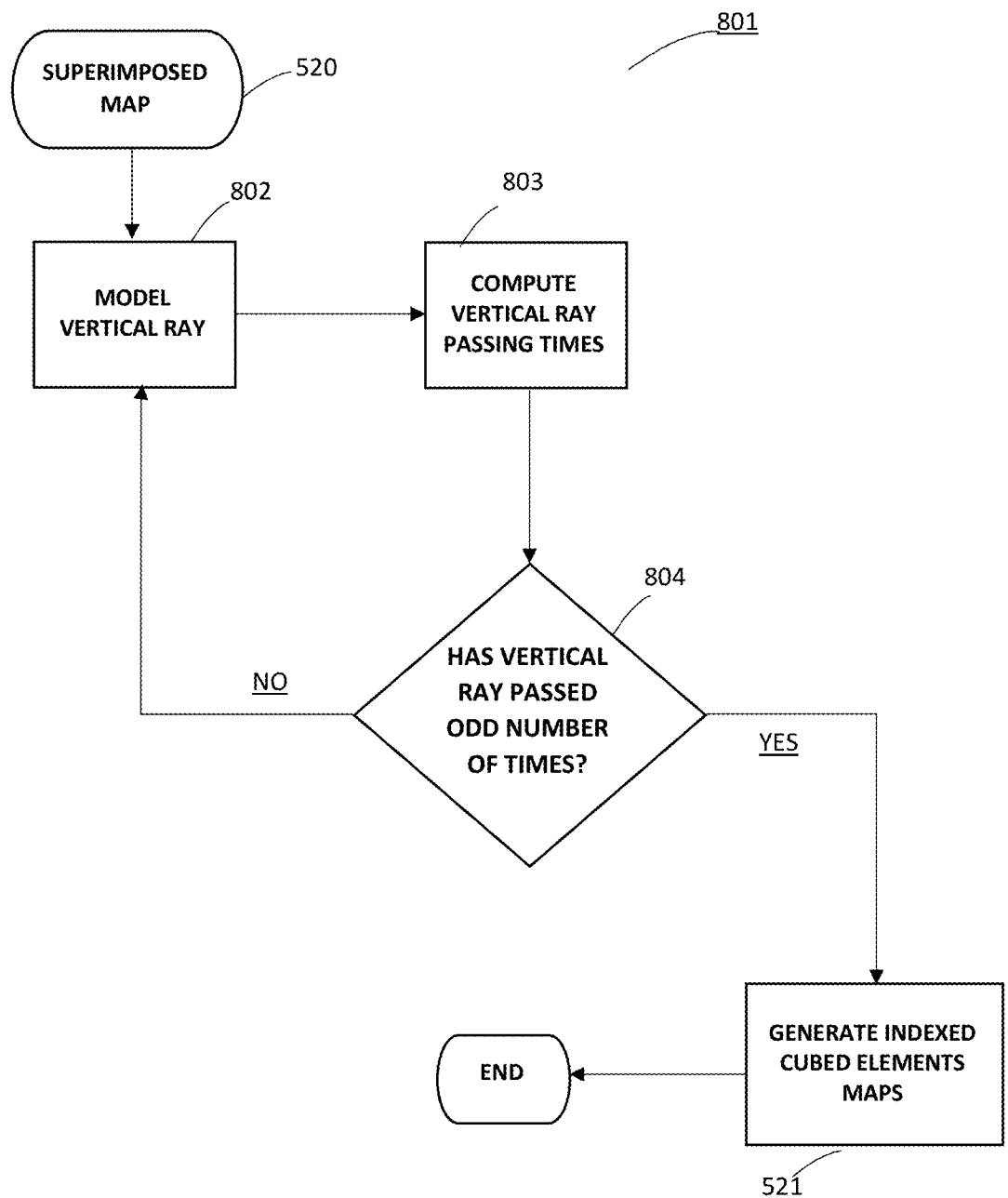
FIG. 8, illustrates a flow chart of the sub-routine of generating an indexed cubed elements maps, having each retrieved source and receiver location; according to an embodiment of the present disclosure.

Once the non-transitory computer readable device, 605 has completed step 519, it will superimpose at 520 the retrieved source and receiver coordinate grid locations over the updated indexed cube coordinates maps, in order to generate at 521, an indexed cubed elements maps, having each retrieved source and receiver location. Step 521 is performed by the non-transitory computer readable device, 605 as a sub-routine process 801 illustrated by FIG. 8, in which the non-transitory computer readable device, 605 will model or cast at 802 a vertical ray in the upward direction 402, starting from the acquired source, and receiver to be detected inside the superimposed indexed cube coordinates map and begin computing at 803 the number of times the modeled vertical ray passes through the boundaries of the elements (such as nodes, vertices, and coordinates) of the stored elements map as explained by FIG. 4. The non-transitory computer readable device, 605 will repeat at 804 the steps of modeling a vertical ray 802 and computing the number of times it passes through the boundaries of the elements (such as nodes, vertices and coordinates) 803 of the stored elements map, until the computed number of times the modeled vertical ray passes through the same boundaries of the elements of the stored elements map, is equal to an odd number of times. This computation will indicate the position of the element, be it inside or outside the superimposed indexed cube coordinates map and allow the generation at step 521, of an indexed cubed elements maps, having each retrieved source and receiver location.

Finally, the non-transitory computer readable device 605 will signal the memory resource 603 to begin storing at 522 the generated indexed cubed elements maps, having each retrieved source and receiver location. Furthermore, the non-transitory computer readable device 605 will signal the computer system device 606, to display on 608 a message to the user of the computing program product embodied in a computing system device 601, to decide whether to store said generated indexed cubed elements maps, having each retrieved source and receiver location to a different memory resource memory resource, such as an external memory device, to print the results to the printing device 611, or both.

Figure 6:
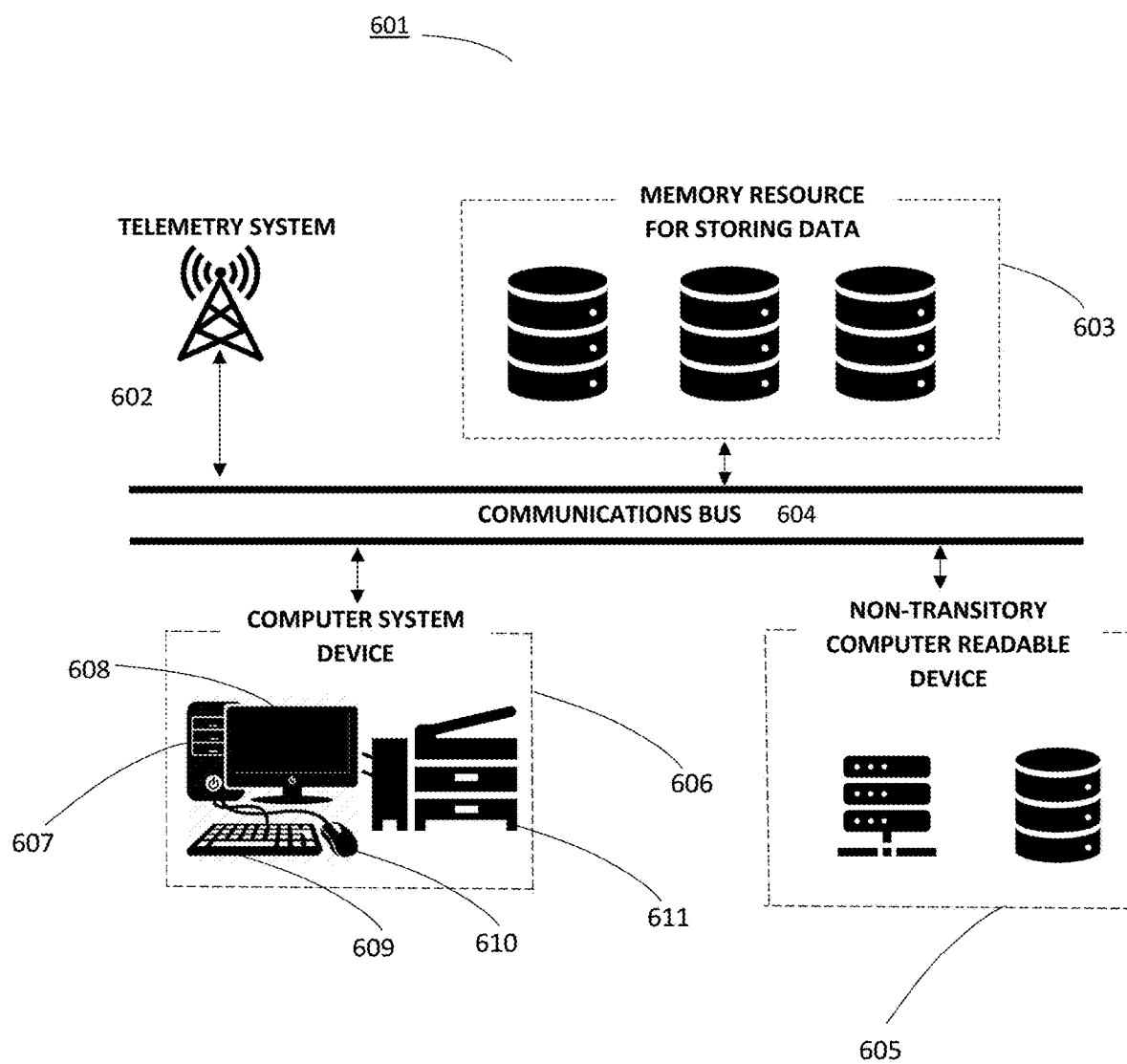
FIG. 6, is an electric diagram, in block form of the computing program product embodied in a computing system device, that stores instructions for implementation by a device, of a method that connects elements to sources and receivers during Spectrum Element Method and Finite Element Method seismic wave modeling, according to an embodiment of the present disclosure.

As it pertains to FIG. 6, the computing program product embodied in a computing system device 601 is shown comprising a telemetry system 602, a memory resource for storing data 603, a communication bus 604, a non-transitory computer readable device 605, and a computer system device 606. The computing program product embodied in a computing system device 601, illustrates a functional block diagram used to perform an array of operations of the method used in a computer program product, that connects elements to sources and receivers during Spectrum Element Method and Finite Element Method seismic wave modeling 501 of FIG. 5.

The memory resource 603 may include any of various forms of memory media and memory access devices. For example, memory devices 603 may include semiconductor RAM and ROM devices as well as mass storage devices such as CD-ROM drives, magnetic disk drives, and magnetic tape drives.

The computer system device, 606, acts as a user interface the non-transitory program computer readable device, 605; to input, set, select, and perform the operations of acquiring, storing, splitting, computing, generating, retrieving, superimposing, re-sizing, locating, indexing, modelling, calculating, and repeating, (collectively the message hook procedures). Said computer system device, 606, is connected to (wired and/or wirelessly) through a communication device 604 to the telemetry system 603, to the memory resource 603, and to the non-transitory computer readable device 605. The computer system device, 606, further includes other devices like a central processing unit (CPU), 607, a display or monitor, 608, a keyboard, 609, a mouse, 610, and a printer, 611. One or more users may supply input to the computing program product embodied in a computing system device 601 through the set of input devices of the computing system 606 like 609 or 610. Nevertheless, a person having ordinary skills in the art will soon realize that input devices may also include devices such as digitizing pads, track balls, light pens, data gloves, eye orientation sensors, head orientation sensors, etc. The set of display devices 608 and 611 may also include devices such as projectors, head-mounted displays, plotters, etc.

In one embodiment of computing program product embodied in a computing system device 601 may include one or more communication devices (communications bus) 604, like network interface cards for interfacing with a computer network. For example, seismic data gathered at a remote site may be transmitted to the computing program product embodied in a computing system device 601 using a telemetry system 602, through a computer network. The computing program product embodied in a computing system device 601 may receive seismic data, coordinates, elements, source and receiver information from an external computer network using the communication's bus 604 network interface card. In other embodiments, the computing program product embodied in a computing system device 601 may include a plurality of computers and/or other components coupled over a computer network, where storage and/or computation implementing embodiments of the present may be distributed over the computers (and/or components) as desired.

The computing program product embodied in a computing system device, 601, has firmware, a kernel and a software providing for the connection and interoperability of the multiple connected devices, like the telemetry system 602, the memory resources for storing data, 603, the communication bus 604, the non-transitory computer readable device, 605, and the computer system device, 606. The computing program product embodied in a computing system device, 601, includes an operating system, a set of message hook procedures, and a system application.

Furthermore, because performance and computation costs are always an important issue, the computing program product embodied in a computing system device, 601, uses the non-transitory computer readable device, 605 to ensure that the steps of the method 501 will not be bottlenecked by the computing system (601) I/O, or any other network communications. In fact, file-distribution systems like Apache Hadoop in combination with proper data-compressions, as well as smart file caching according to the data will ensure that the method used in a computer program product, that connects elements to sources and receivers during Spectrum Element Method and Finite Element Method seismic wave modeling 501 of FIG. 5 is only limited by the memory/cache speed and CPU/GPU computing power, and nothing else.

The operating system embedded within the computing program product embodied in a computing system device 601, may be a Microsoft "WINDOWS" operating system, OS/2 from IBM Corporation, UNIX, LINUX, Sun Microsystems, or Apple operating systems, as well as myriad embedded application operating systems, such as are available from Wind River, Inc.

The message hook procedures of computing program product embodied in a computing system device 601 may, for example, represent an operation or command of the memory resources, 603, the computer system device, 606, the non-transitory computer readable device, 605, which may be currently executing a certain step process or subroutine from the method used in a computer program product, that connects elements to sources and receivers during Spectrum Element Method and Finite Element Method seismic wave modeling 501 of FIG. 5.

The set of message hook procedures may be first initiated by: (i) an input from a user, which will typically be a person having ordinary skills in the art, like the entering of user-defined values or parameters; (ii) the manipulation of the computer system device, 606; (iii) the processing of operations in the non-transitory computer readable memory device, 605; or (iv) automatically once certain data has been stored or retrieved by either the memory resources, 603, or the non-transitory computer readable memory device, 605. Based on any of these inputs, processes or manipulation events, the memory resource, 603, the non-transitory computer readable memory device, 605, or the computer system device, 606; generate a data packet that is passed using the communication bus, 604, which are indicative of the event that has occurred as well as the event that needs to occur. When either the memory resource, 603, the non-transitory computer readable device, 605, or the computer system device, 606, receive the data packet, they convert it into a message based on the event, and executes the required step of the method 501. This is achieved when the operating system examines the message hook list and determines if any message hook procedures have registered themselves with the operating system before. If at least one message hook procedure has registered itself with the operating system, the operating system passes the message via the communication bus 604 to the registered message hook procedure that appears first on the list. The called message hook executes and returns a value to either the memory resource, 603, the non-transitory computer readable memory device, 605, or the computer system device, 606, instructing them, to pass the message to the next registered message hook, and either the memory resource, 603, the non-transitory computer readable memory device, 605, or the computer system device, 606. The computing program product embodied in a computing system device 601, continues executing the operations until all registered message hooks have passed, which indicates the completion of the method 501 by the generation and storing of an indexed cubed elements maps having each retrieved source and receiver location to the memory resource.

The non-transitory computer readable device, 605, is configured to read and execute program instructions, e.g., program instructions provided on a memory medium such as a set of one or more CD-ROMs and loaded into semiconductor memory at execution time. The non-transitory computer readable device, 605 may be coupled wired or wireless to memory resource 603 through the communication bus 604 (or through a collection of busses). In response to the program instructions, the non-transitory computer readable memory device, 605 may operate on data stored in one or more memory resource 603. The non-transitory computer readable memory device, 605 may include one or more programmable processors (e.g., microprocessors).

According the preferred embodiment of the present invention, certain hardware, and software descriptions were detailed, merely as example embodiments and are not to limit the structure of implementation of the disclosed embodiments. For example, although many internal, and external components have been described, those with ordinary skills in the art will appreciate that such components and their interconnection are well known. Additionally, certain aspects of the disclosed invention may be embodied in software that is executed using one or more, receiving systems, computers systems devices, or non-transitory computer readable memory devices. Program aspects of the technology may be thought of as "products" or "articles of manufacture" typically in the form of executable code and/or associated data that is carried on, or embodied in, a type of machine readable medium. Tangible non-transitory "storage" type media and devices include any or all memory or other storage for the computers, process or the like, or associated modules thereof such as various semiconductor memories, tape drives, disk drives, optical or magnetic disks, and the like which may provide storage at any time for the software programming.

It is to be noted that, As used herein the term "survey region" refers to an area or volume of geologic interest, and may be associated with the geometry, attitude and arrangement of the area or volume at any measurement scale. A region may have characteristics such as folding, faulting, cooling, unloading, and/or fracturing that has occurred therein.

Also, the term "computing" encompasses a wide variety of actions, including calculating, determining, processing, deriving, investigation, look ups (e.g. looking up in a table, a database or another data structure), ascertaining and the like. It may also include receiving (e.g. receiving information), accessing (e.g. accessing data in a memory) and the like. "Computing" may include resolving, selecting, choosing, establishing, and the like.

Embodiments disclosed herein also relate to a method and computing program product embodied in a computing system device, that stores instructions for implementation by a device, of a method that connects elements to sources and receivers during Spectrum Element Method and Finite Element Method seismic wave modeling. This method and system may be specially constructed for the required purposes, or it may comprise a general-purpose computer selectively activated or reconfigured by a computer program or code stored in the memory resources, or non-transitory computer readable memory. As such, the computer program or code for the method disclosed herein may be stored or encoded in a computer readable medium or implemented over some type of transmission medium. A computer-readable medium includes any medium or mechanism for storing or transmitting information in a form readable by a machine, such as a computer ("machine" and "computer" may be used synonymously herein). As a non-limiting example, a computer-readable medium may include a computer-readable storage medium (e.g., read only memory ("ROM"), random access memory ("RAM"), magnetic disk storage media, optical storage media, flash memory devices, etc.). A transmission medium may be twisted wire pairs, coaxial cable, optical fiber, or some other suitable wired or wireless transmission medium, for transmitting signals such as electrical, optical, acoustical or other form of propagated signals (e.g., carrier waves, infrared signals, digital signals, etc.).

A receiving system or sensor as used herein, typically includes at least hardware capable of executing machine readable instructions, as well as the software for executing acts (typically machine-readable instructions) that produce a desired result. In addition, a retrieving system may include hybrids of hardware and software, as well as computer sub-systems.

Hardware generally includes at least processor-capable platforms, such as client-machines (also known as servers), and hand-held processing devices (for example smart phones, personal digital assistants (PDAs), or personal computing devices (PCDs)). Further, hardware may include any physical device that can store machine-readable instructions, such as memory or other data storage devices. Other forms of hardware include hardware sub-systems, including transfer devices such as modems, modem cards, ports, and port cards, for example.

Software includes any machine code stored in any memory medium, such as RAM or ROM, and machine code stored on other devices (such as non-transitory computer readable media like external hard drives, or flash memory, for example). Software may include source or object code, encompassing any set of instructions capable of being executed in a client machine, server machine, remote desktop, or terminal.

Combinations of software and hardware could also be used for providing enhanced functionality and performance for certain embodiments of the disclosed invention. One example is to directly manufacture software functions into a silicon chip. Accordingly, it should be understood that combinations of hardware and software are also included within the definition of a retrieving system and are thus envisioned by the invention as possible equivalent structures and equivalent methods.

Data structures are defined organizations of data that may enable an embodiment of the invention. For example, a data structure may provide an organization of data, or an organization of executable code. Data signals could be carried across non-transitory transmission mediums and stored and transported across various data structures, and, thus, may be used to transport an embodiment of the invention.

The computing program product embodied in a computing system device, that stores instructions for implementation by a device, of a method that connects elements to sources and receivers during Spectrum Element Method and Finite Element Method seismic wave modeling may be designed to work on any specific architecture. For example, the system may be executed on a high-performance computing system, which typically comprise the aggregation of multiple single computers, physically connected, or connected over local area networks, client-server networks, wide area networks, internets, hand-held and other portable and wireless devices and networks.

A "computer or computing system device" includes the direct act that causes generating, as well as any indirect act that facilitates generation. Indirect acts include providing software to a user, maintaining a website through which a user is enabled to affect a display, hyperlinking to such a website, or cooperating or partnering with an entity who performs such direct or indirect acts. Thus, a user may operate alone or in cooperation with a third-party vendor to enable the reference signal to be generated on a display device. A display device may be included as an output device, and shall be suitable for displaying the required information, such as without limitation a CRT monitor, an LCD monitor, a plasma device, a flat panel device, or printer. The display device may include a device which has been calibrated through the use of any conventional software intended to be used in evaluating, correcting, and/or improving display results (e.g., a color monitor that has been adjusted using monitor calibration software). Rather than (or in addition to) displaying the reference image on a display device, a method, consistent with the invention, may include providing a reference image to a subject.

Acquiring certain data may include creating or distributing the referenced data to the subject by physical, telephonic, or electronic delivery, providing access over a network to the referenced data, or creating or distributing software to the subject configured to run on the subject's workstation or computer including the reference image. In one example, acquiring of a referenced data or information could involve enabling the subject to obtain the referenced data or information in hard copy form via a printer. For example, information, software, and/or instructions could be transmitted (e.g., electronically or physically via a data storage device or hard copy) and/or otherwise made available (e.g., via a network) in order to facilitate the subject using a printer to print a hard copy form of reference image. In such an example, the printer may be a printer which has been calibrated through the use of any conventional software intended to be used in evaluating, correcting, and/or improving printing results (e.g., a color printer that has been adjusted using color correction software).

A database, or multiple databases may comprise any standard or proprietary database software, such as Oracle, Microsoft Access, SyBase, or DBase II, for example. The database may have fields, records, data, and other database elements that may be associated through database specific software. Additionally, data may be mapped. Mapping is the process of associating one data entry with another data entry. For example, the data contained in the location of a character file can be mapped to a field in a second table. The physical location of the database is not limiting, and the database may be distributed. For example, the database may exist remotely from the server, and run on a separate platform. Further, the database may be accessible across a local network, a wireless network of the Internet.

Furthermore, modules, features, attributes, methodologies, and other aspects can be implemented as software, hardware, firmware or any combination thereof. Wherever a component of the invention is implemented as software, the component can be implemented as a standalone program, as part of a larger program, as a plurality of separate programs, as a statically or dynamically linked library, as a kernel loadable module, as a device driver, and/or in every and any other way known now or in the future to those of skill in the art of computer programming. Additionally, the invention is not limited to implementation in any specific operating system or environment.

Various terms as used herein are defined above and below. To the extent a term used in a claim is not defined, it should be given the broadest possible definition persons in the pertinent art have given that term as reflected in at least one printed publication or issued patent.

As used herein, "and/or" placed between a first entity and a second entity means one of (1) the first entity, (2) the second entity, and (3) the first entity and the second entity.

Multiple elements listed with "and/or" should be construed in the same fashion, i.e., "one or more" of the elements so conjoined Additionally, the flowcharts and block diagrams in the Figures ("FIG.") illustrate the architecture, functionality, and operation of possible implementations of systems, methods, and computer program products according to various embodiments of the present disclosure. It should also be noted that, in some alternative implementations, the functions noted in the block may occur out of the order noted in the Figures. For examples, two blocks shown in succession may, in fact, be executed substantially concurrently, or the blocks may sometimes be executed in the reverse order, depending upon the functionality involved. It will also be noted that each block of the block diagrams and/or flowcharts illustration, and combinations of blocks in the block diagrams and/or flowchart illustration, can be implemented by special purpose hardware-based systems that perform the specified hardware functions or acts, or combinations of special purpose hardware and computer instructions.

While in the foregoing specification this disclosure has been described in relation to certain preferred embodiments thereof, and many details have been set forth for purpose of illustration, the invention is not to be unduly limited to the foregoing which has been set forth for illustrative purposes. On the contrary, a wide variety of modifications and alternative embodiments will be apparent to a person skilled in the art, without departing from the true scope of the invention, as defined in the claims set forth below. Additionally, it should be appreciated that structural features or method steps shown or described in any one embodiment herein can be used in other embodiments as well.

What is claimed is:

1. A method to be used in a computer program product, that connects elements to sources and receivers during Spectrum Element Method and Finite Element Method seismic wave modeling, the method comprising:
    acquiring elements, source, and receiver coordinate grid locations from a survey region;
    storing the acquired elements, source, and receiver coordinate grid locations to a memory resource;
    generating a coordinates map from the element coordinate grid locations;
    storing the generated coordinates map to the memory resource;
    splitting the stored coordinates map into cubes having coordinate grid locations;
    generating a cubed coordinates map;
    storing the generated cubed coordinates map to the memory resource;
    computing an algorithm index for the stored cube coordinates map;
    generating an indexed cube coordinates map;
    retrieving the stored elements coordinate grid locations from the memory resource;
    generating an elements map applying the retrieved elements coordinate grid location;
    storing the generated elements map to the memory resource;
    superimposing the generated indexed cube coordinates map over the stored elements map to generate an updated indexed cube coordinates maps;
    retrieving the acquired source, and receiver coordinate grid locations from the memory resource;
    superimposing the retrieved source and receiver coordinate grid locations over the updated indexed cube coordinates maps;
    generating an indexed cubed elements maps having each retrieved source and receiver location; and
    storing the generated indexed cubed elements maps having each retrieved source and receiver location to the memory resource.

2. The method of claim 1, wherein the acquired elements, source, and receiver coordinate grid locations from a survey region further comprises elements having nodes and vertices that are both constrained by structure boundaries.

3. The about method of claim 1, wherein the acquired elements, source, and receiver coordinate grid locations from a survey region further comprises elements having physical properties that comprises velocity that seismic waves propagate.

4. The method of claim 1, wherein the step of superimposing the generated indexed cube over the stored elements map further comprises: defining boundaries by computing the maximum and minimum coordinates of the retrieved elements coordinate grid locations from a survey region; retrieving the stored cubed coordinates map from the memory resource; re-sizing the retrieved stored cubed coordinates map size according to expression:

$$\begin{cases} dx = \dfrac{x_1 - x_0}{nx} \\ dy = \dfrac{y_1 - y_0}{ny} \\ dz = \dfrac{z_1 - z_0}{nz} \end{cases};$$

locating a first element and a first vertex of the first element within the retrieved cubed coordinates map; indexing the located first element and first vertex to the re-sized cubed coordinate map; repeating the steps of locating and indexing for every element and vertex of an element within the re-sized stored cubed coordinate map size; and computing a final cube index for every located and indexed element and vertex of an element according to expression:

$$\begin{cases} ix = \left\lfloor \dfrac{x - x_0}{dx} \right\rfloor \\ iy = \left\lfloor \dfrac{y - y_0}{dy} \right\rfloor \\ iz = \left\lfloor \dfrac{z - z_0}{dz} \right\rfloor \end{cases}.$$

5. The method of claim 1, wherein the step of generating an indexed cubed elements maps having each retrieved source and receiver location further comprises:
    modeling a vertical ray in the upward direction, starting from the acquired source and receiver to be detected inside the superimposed indexed cube coordinates map; computing the number of times the modeled vertical ray passes through the boundaries of the elements of the stored elements map; and repeating the steps of modeling a vertical ray and computing the number of times, until the computed number of times the modeled vertical ray passes through the same boundaries of the elements of the stored elements map is equal to an odd number of times.

6. A computing program product embodied in a computing system device that stores instructions for implementation by a device of a method that connects elements to sources and receivers during Spectrum Element Method and Finite Element Method seismic wave modeling, the instructions comprising:

acquiring elements, source, and receiver coordinate grid locations from a survey region;

storing the acquired elements, source, and receiver coordinate grid locations to a memory resource;

generating a coordinates map from the element coordinate grid locations;

storing the generated coordinates map to the memory resource;

splitting the stored coordinates map into cubes having coordinate grid locations;

generating a cubed coordinates map;

storing the generated cubed coordinates map to the memory resource;

computing an algorithm index for the stored cube coordinates map;

generating an indexed cube coordinates map;

retrieving the stored elements coordinate grid locations from the memory resource;

generating an elements map applying the retrieved elements coordinate grid location;

storing the generated elements map to the memory resource;

superimposing the generated indexed cube coordinates map over the stored elements map to generate an updated indexed cube coordinates maps;

retrieving the acquired source, and receiver coordinate grid locations from the memory resource;

superimposing the retrieved source and receiver coordinate grid locations over the updated indexed cube coordinates maps;

generating an indexed cubed elements maps having each retrieved source and receiver location; and storing the generated indexed cubed elements maps having each retrieved source and receiver location to the memory resource.

7. The computing program product embodied in a computing system device that stores instructions for implementation by a device of claim 6, wherein the instructions are stored in a memory resource.

8. The computing program product embodied in a computing system device that stores instructions for implementation by a device of claim 6, wherein the device of the computer program product is executed by a non-transitory computer readable medium device coupled through a communication bus to the memory resource.

9. The computing program product embodied in a computing system device that stores instructions for implementation by a device of claim 6, wherein the device further comprises program code instructions, which can be loaded in a programmable device to cause said programmable device to implement the instructions according to claim 6, when said program is executed by a processor of the non-transitory computer readable medium device.

10. The computing program product embodied in a computing system device that stores instructions for implementation by a device of claim 6, wherein the instruction of superimposing the generated indexed cube over the stored elements map further comprises: defining boundaries by computing the maximum and minimum coordinates of the retrieved elements coordinate grid locations from a survey region; retrieving the stored cubed coordinates map from the memory resource; re-sizing the retrieved stored cubed coordinate map size according to expression:

$$\begin{cases} dx = \frac{x_1 - x_0}{nx} \\ dy = \frac{y_1 - y_0}{ny} \\ dz = \frac{z_1 - z_0}{nz} \end{cases};$$

locating a first element and a first vertex of the first element within the retrieved cubed coordinates map; indexing the located first element and first vertex to the re-sized cubed coordinate map; repeating the steps of locating and indexing for every element and vertex of an element within the re-sized stored cubed coordinate map size; and computing a final cube index for every located and indexed element and vertex of an element according to expression:

$$\begin{cases} ix = \left\lfloor \frac{x - x_0}{dx} \right\rfloor \\ iy = \left\lfloor \frac{y - y_0}{dy} \right\rfloor \\ iz = \left\lfloor \frac{z - z_0}{dz} \right\rfloor \end{cases}.$$

11. The computing program product embodied in a computing system device that stores instructions for implementation by a device of claim 6, wherein the instruction of generating an indexed cubed elements maps having each retrieved source and receiver location, further comprises: modeling a vertical ray in the upward direction starting from the acquired source and receiver to be detected inside the superimposed indexed cube coordinates map; computing the number of times the modeled vertical ray passes through the boundaries of the elements of the stored elements map; and repeating the steps of modeling a vertical ray and computing the number of times until the computed number of times the modeled vertical ray passes through the same boundaries of the elements of the stored elements map, is equal to an odd number of times.

* * * * *